United States Patent [19]

Stevens

[11] Patent Number: 5,124,062

[45] Date of Patent: Jun. 23, 1992

[54] PAINT STRIPPER AND VARNISH REMOVER COMPOSITIONS, METHODS FOR MAKING THESE COMPOSITIONS AND METHODS FOR REMOVING PAINT AND OTHER POLYMERIC COATINGS FROM FLEXIBLE AND INFLEXIBLE SURFACES

[75] Inventor: Edwin Stevens, West Orange, N.J.

[73] Assignee: Stevens Sciences Corp., West Orange, N.J.

[21] Appl. No.: 689,126

[22] Filed: Apr. 22, 1991

Related U.S. Application Data

[63] Continuation of Ser. No. 375,137, Jun. 30, 1989, abandoned.

[51] Int. Cl.⁵ .................. C11D 7/22; C11D 7/32; C11D 7/50
[52] U.S. Cl. .................. 252/162; 252/153; 252/170; 252/171; 252/DIG. 8; 134/38; 134/39; 134/40
[58] Field of Search .............. 252/170, 171, 153, 162, 252/DIG. 8; 134/38, 39, 40

[56] References Cited

U.S. PATENT DOCUMENTS

| | | | |
|---|---|---|---|
| 2,705,207 | 3/1955 | Stevens | 252/DIG. 8 |
| 3,915,880 | 10/1975 | Sepulveda | 252/DIG. 8 |
| 3,950,185 | 4/1976 | Toyama . | |
| 3,954,648 | 5/1976 | Belcak | 252/170 |
| 4,276,186 | 6/1981 | Bakos | 252/DIG. 8 |
| 4,294,729 | 10/1981 | Bakos | 252/545 |
| 4,426,250 | 1/1984 | Brailsford | 156/655 |
| 4,511,488 | 4/1985 | Matta . | |
| 4,518,518 | 5/1985 | Koch . | |
| 4,533,487 | 8/1985 | Jones | 252/172 |
| 4,537,705 | 8/1985 | Mahoney et al. . | |
| 4,617,251 | 10/1986 | Sizensky . | |
| 4,619,706 | 10/1986 | Squires et al. . | |
| 4,640,719 | 2/1987 | Hayes et al. . | |
| 4,749,510 | 6/1988 | Nelson | 252/166 |
| 4,780,235 | 10/1988 | Jackson | 252/163 |
| 4,812,255 | 3/1989 | Suwala | 252/DIG. 8 |
| 5,024,780 | 6/1991 | Leys | 252/172 |

OTHER PUBLICATIONS

*Hawley's Condensed Chemical Dictionary*, p. 425, Van Nostrand Reinhold Company, New York.

*Primary Examiner*—A. Lionel CLingman
*Assistant Examiner*—William S. Parks
*Attorney, Agent, or Firm*—Henry D. Coleman; R. Neil Sudol

[57] ABSTRACT

The present invention relates to non-toxic, non-flammable, safe compositions employing primarily biodegradable components for use in removing and stripping paint, varnishes and stains from hard and/or flexible surfaces. The compositions avoid the use of methylene chloride, methanol, toluol or acetone. Paint stripper compositions of the present invention have flash points above about 120° F. and an absence of low-boiling VOC's comprising:

a. about 10% to about 60% by weight of a terpene compound containing at least 10 carbon atoms;

b. about 10% to about 50% by weight of N-methyl pyrrolidone or its equivalent; and c. about 2% to about 20% by weight of a terpene emulsifying surfactant.

Compositions of the present invention may further comprise at least one of the following: about 5% to about 15% by weight of a solvent extender or bulking agent, about 10% to about 60% of a high flash point, high $K_B$ (kauri-butanol) solvent selected from the group consisting of ethylene carbonate, propylene carbonate, butylene carbonate, glycols and glycol ethers, about 0% to about 20% water, from 0% to about 5% by weight of a thixotropic or thickening agent, and mixtures, thereof. In addition, for certain industrial applications it has surprisingly been found that the use of certain chlorofluorocarbons in an amount ranging from about 2% up to about 40% results in compositions exhibiting especially advantageous stripping efficiencies.

86 Claims, No Drawings

PAINT STRIPPER AND VARNISH REMOVER COMPOSITIONS, METHODS FOR MAKING THESE COMPOSITIONS AND METHODS FOR REMOVING PAINT AND OTHER POLYMERIC COATINGS FROM FLEXIBLE AND INFLEXIBLE SURFACES

This application is a continuation application of U.S. Pat. application Ser. No. 375,137, filed Jun. 30, 1989, now abandoned.

FIELD OF THE INVENTION

The present invention relates to non-toxic, non-flammable, safe compositions employing primarily biodegradable components for use in removing and stripping paint, varnishes and stains from hard and/or flexible surfaces. The compositions avoid the use of methylene chloride, methanol, toluol or acetone.

BACKGROUND OF THE INVENTION

With the introduction of new and more durable types of synthetic resins and polymers in protective and decorative coatings, the problem of stripping has become increasingly difficult. Prior art paint removers typically contain blends of aromatic solvents, ketones, paraffin, methanol and diluents, for example, mineral spirits in order to reduce raw material costs. Those prior art strippers made with the foregoing solvents focused industry attention on the flammable and toxic characteristics.

As an alternative, improved prior art solvents utilize chlorinated solvents as a way to extend the usefulness of paint strippers while simultaneously reducing fire hazards associated with their use. Methylene chloride (dichloromethane) has been almost universally used as the solvent of choice, although some compositions have been formulated with ethylene dichloride and trichlorethylene, among other chlorinated hydrocarbon solvents. Many of the chlorinated hydrocarbons including methylene chloride are suspected carcinogens and methylene chloride is designated a hazardous substance under the Federal Hazardous Substance Act (FHSA). In addition, methylene chloride, as a high vapor pressure chlorinated solvent, probably contributes to atmospheric ozone depletion. Methanol is a poison if ingested and the U.S. Consumer Products Safty Commission requires a warning designating it as a poison when its concentration in consumer products exceeds 4 percent by weight. Toluene contains trace quantities of benzene, a known carcinogen, and acetone with its high vapor pressure and low flash point is highly flammable.

Paint strippers which include methylene chloride can be formulated to soften, lift and blister paint films. The stripper which is applied to the substrate by brush, immersion or spray and allowed to loosen the paint or varnish has an available work life of only several minutes because of the tendency of the methylene chloride to evaporate rapidly. Because of the high vapor pressure of methylene chloride, in an effort to extend the work life of the stripper made with that solvent, paraffin is often included as an evaporation suppressant. The paraffin functions by forming a thin film at the surface of the paint remover which retards evaporation. This thin film formation and resultant evaporation suppressant activity of paraffin is produced by the evaporation and surface chilling which occur when methylene chloride or mixtures containing methylene chloride are exposed to air. However, methylene chloride strippers must be handled carefully since they are highly toxic and can cause severe skin irritation. Further, even with the incorporation of paraffin, the volatility of the methylene chloride is still very high and when methylene chloride is formulated with, for example, toluene, the resulting high levels of hydrocarbon emissions necessitate the provision of good ventilation to safely use the methylene chloride paint strippers.

A further disadvantage of paint strippers formulated with methylene chloride is that the short work life compromises the ability of the stripper to function efficiently in many applications. For example, many industrial uses of paint strippers involve stripping accumulated paint from equipment and walls. Paint strippers utilizing methylene chloride, suffer from the disadvantage that the short work life prevents the stripper from entering crevices in the accumulated paint layers thus creating the necessity, in some cases, of applying a large number of applications of stripper to remove a number of accumulated paint layers. Furthermore, the short work life of methylene chloride creates a recoating phenomenon in which stripped paint recoats the surface of one of the accumulated paint layers or the surface to be stripped as the solvent evaporates.

To remove paint on vertical surfaces, a thickener is generally added to avoid the problem of stripper flowing off the surface before it has had a chance to remove the paint layer. It is preferable to add a thickener, which in combination with the other stripper ingredients, may be easily washed off the surface after the stripping has taken place. However, if a paint stripper is too thick, it may be used on vertical surfaces, but it may not be amenable to spraying. Furthermore, the use of methylene chloride within the stripper may evaporate, thus producing a stripper which varies greatly in viscosity as a function of the evaporation time of the solvents in the stripper. Depending upon the required viscosity and the compatibility of the paint stripper ingredients with the paint stripper thickening system it may be necessary to reformulate the paint stripper with each application. Because of their high flash point, stripping compositions of the present invention may be adapted for a number of applications by simply changing the amount and type of thickener employed without modifying the other components.

OBJECTS OF THE PRESENT INVENTION

It is an object of the present invention to provide paint stripper compositions which are safe and effective to remove paint and other polymeric coatings in protective and decorative coatings on flexible and inflexible surfaces.

It is also an object of the present invention to provide compositions which are non-flammable and effective paint strippers which do not contain petroleum based aromatic compounds, ketones or methanol.

It is an additional object of the present invention to provide stripping compositions and methods for removing conventional lacquers, varnishes, enamels, for example, drying oil type, alkyds, or drying oil-alkyd modified enamels, epoxy esters, epoxy amides, amine-catalyzed epoxies, acrylics and polyurethanes, among others.

It is a further object of the present invention to provide a method of stripping polymeric coatings using the compositions of the present invention.

It is yet another object of the present invention to provide a method of making the compositions of the present invention, especially those compositions which are thixotropic and utilize microgel formation.

It is still a further object of the present invention to provide efficient paint stripping compositions which are pleasant, non-offensive in odor and which do not emit harmful fumes.

It is yet an additional object of the present invention to provide an effective paint and varnish removing composition which is non-caustic, has a neutral pH and will not harm wood.

Still an additional object of the present invention is a stripping composition that stays wet and active longer, may cover more surface area than prior art compositions and strips through multiple layers of paint and varnish.

SUMMARY OF THE INVENTION

These and other objects of the present invention are accomplished by paint stripper compositions having flash points above about 120° F. and an absence of low-boiling VOC's comprising:

a. about 10% to about 60% by weight of a terpene compound containing at least 10 carbon atoms;
b. about 10% to about 50% by weight of N-methyl pyrrolidone or its equivalent; and
c. about 2% to about 20% by weight of a terpene emulsifying surfactant.

Compositions of the present invention may further comprise one or more of the following: about 5% to about 15% by weight of a solvent extender or bulking agent, about 10% to about 60% of a high flash point, high $K_B$ (kauri-butanol) solvent selected from the group consisting of ethylene carbonate, propylene carbonate, butylene carbonate, glycols and glycol ethers, about 0% to about 20% water, from 0% to about 5% by weight of a thixotropic or thickening agent, about 2% to about 20% by weight of an odor masking component, for example d'limonene and mixtures, thereof. Depending upon the desired pH of the compositions, a base or acid may additionally be added to adjust the pH of the compositions of the present invention. In addition, for certain industrial applications it has surprisingly been found that the use of certain halogenated hydrocarbons containing both chlorine and fluorine in an amount ranging from about 2% up to about 40% results in compositions exhibiting especially advantageous stripping efficiencies.

The paint stripper compositions of the present invention are safe, effective and can be used in a wide variety of applications. Environmentally safe, biodegradable compositions of the present invention solve many of the problems associated with the use of low-boiling chlorinated hydrocarbons in prior art paint strippers, including the health hazards and environmental problems associated with the use of those stippers. The compositions of the present invention have a high flash point, preferably above about 93° C. (200° F.), are generally biodegradable and can be formulated to be highly active in the pH range of about 6.0 to about 8.0, a particularly useful advantage over prior art compositions. In addition, certain embodiments of the present invention provide the advantage that they can be used to treat a coated surface and then removed by simply washing the treated surface with water.

In one particularly preferred aspect of the present invention, stripper compositions of the present invention are adsorbed onto paper or fabric sheets and used to strip paint and other coatings from a surface. Sheets to which are adsorbed the compositions of the present invention are very easy to handle and provide simple and efficient means to remove paint from large surface areas, for example walls, doors and panels.

The compositions of the present invention can be used to strip or remove conventional lacquers, varnishes, enamels, epoxy esters, epoxy amides and acrylics, among other polymeric coatings. The time required to strip paint finishes completely is competitive with that of conventional strippers containing chlorinated solvents, and ranges from about 20 minutes to about 80 minutes, with a preferred range of about 20 to about 35 minutes.

In removing coatings from surfaces, the compositions of the present invention produce a wrinkling or blistering of the polymer coating. While not to be limited by theory, this fundamental blistering is believed to be produced by swollen gel. When normally insoluble high polymers are placed in contact with an active solvent, the polymer absorbs the solvent and expands until an equilibrium condition occurs. In order to accommodate the increased volume and still remain within the original surface perimeter, the polymer tends to fold or wrinkle so as to relieve internal stresses. The solvent mixtures solvate the active groups of the polymer, and in so doing, reduce solid to solid adhesion. The forces which build up in the polymer generally, as a result of a combination of swelling and weakened adhesion, are sufficiently high to tear the film loose from the surface. Wrinkle formation occurs because solvent penetration into the polymer and deterioration of the polymer cohesive bonds proceed at approximately the same speed. There is rapid parting of the film from the substrate and almost as rapid rupturing of the film itself.

In the method aspects of the present invention, compositions of the present invention are used to strip and/or remove polymeric coatings on a number of surfaces. In a particularly preferred method of using the compositions of the present invention, stripping composition preferably adsorbed to fabric or paper is placed in contact with a coated surface and after a period of time sufficient to soften and/or blister the underlying coating, the paper is removed along with the softened coating in one easy step.

Depending upon the formulation of the composition to be used, further method aspects of the present invention involve making the compositions of the present invention using a stepwise procedure in which thixotropic agents are mixed separately from the active ingredients. Certain thixotropic compositions, for example methylcellulose, such as Methocel 311, available from Dow Chemical Corp. Midland, Mich., hydroxypropyl cellulose, Klucell TM, available from Hercules, Inc., Wilmington, Del., ethyl cellulose, such as Bermocol PR TM, available from Seaboard Sales, N.J.) and clays modified with quaternary compounds (high medium and low polar), such as Bentone 27, a product of NL Industries, N.J., U.S.A. containing from 0% to about 5%, preferably about 0.02% to about 5%, and most preferably about 1 to about 3% of thixotropic agent preferably in microgel form are made by producing the microgel separately from the active components to prevent their encapsulation and then adding the component in which microgel formation has occurred to the active ingredients of the compositions. Microgel formation which occurs separate from the other active agents in the compositions of the present invention produces a composition exhibiting acceptable thixotropy for stripping or removing polymeric coatings on vertical surfaces and enhanced stripping activity. In addition, this method aspect of the present invention results in a composition that is much easier to make than compositions in which microgel formation occurs in the presence of the active ingredients and the quality control of which can be easily monitored.

DETAILED DESCRIPTION OF THE INVENTION

The compositions of the present invention comprise from about 10% to about 60% by weight of a terpene compound. As used herein, the term terpene refers to a class of acyclic and cyclic unsaturated compounds derived from natural essential oils and resins having at least 10 carbon atoms. Terpenes that find use in the present invention include alcohols and aldehydes as well as unsaturated hydrocarbons. Any number of terpene compounds, including combinations of these terpenes may be used in the present invention as the base or primary solvent as polymer absorbents. Preferred terpene compounds are those compounds which have a $K_B$ value of at least about 108 (the same value as toluol, an aromatic hydrocarbon which is the solvent of choice in many prior art strippers) and a flash point above about 120° F.

$K_B$ is a measure of the solvency of a hydrocarbon. In general, the higher the $K_B$ value, the greater the general solvent power of the hydrocarbon under test conditions described by ASTM D1133. To determine $K_B$ value, a hydrocarbon sample is added to a standard solution of kauri gum in butyl alcohol until sufficient kauri gum precipitates to blur vision of 10 point type viewed through the flask. When used in varnish, lacquer and enamel formulations, a hydrocarbon diluent with a high $K_B$ value dissolves relatively large quantities of solids.

The preferred terpene compounds for use in the present invention are represented by unsaturated hydrocarbons, alcohols and aldehydes having at least 10 carbon atoms and include 3,7-dimethyloctanol, alpha-pinene, beta-pinene, delta-3-carene, citronellal, citronellol, hydroxycitronellal, d-limonene, linalool, gamma-terpinene, tetrahydrolinalool and terpineol, among others, with cyclic terpenes being preferred. Especially preferred terpenes for use in compositions of the present invention include dipentene, because of its high $K_B$ value. A preferred mixture of terpenes for use in the present invention includes Pine Oil TM from Glidco (Jacksonville, Fla.) because of its very high $K_B$ value (500) and its relatively high boiling range (190° C. to 222° C.). Pine Oiltm contains a number of terpine alcohols and terpene hydrocarbons, including high percentages of alpha-terpineol.

Compositions of the present invention comprise about 10% to about 60% by weight of a terpene compound. Preferred compositions of the present invention may comprise between about 15% to about 50% by weight of a terpene compound, and most preferably, comprise between about 15% to about 30% by weight of a terpene compound. The terpene compounds of the present invention are used in the above-defined weight ranges because these weight ranges are effective to cause polymer expansion which facilitates paint stripping.

In certain embodiments where the preferred terpene, dipentene is used, a malodor associated with thiols sometimes occurs. In such cases, a natural odor masker, for example, d'limonene, among other odor masking agents, is added in an amount ranging from about 2% to aobut 20% to make the compositions more pleasant in odor.

Compositions of the present invention also comprise between about 10% to about 50% by weight of N-methylpyrrolidone or its equivalent. N-methylpyrrolidone is a highly polar, water-miscible solvent which is also miscible with almost all conventional organic solvents. It is also soluble in a wide range of polymers used in the coatings industry. It serves to dissociate chemical groupings in the coatings which are not dissociated by the primary terpene solvent. Compositions containing as little as 10% by weight N-methylpyrrolidone are useful, but are slower in stripping efficiency than compositions containing higher weight percentages of N-methylpyrrolidone. Other solvents similar to N-methylpyrrolidone in solubility and solvent power may be used in the present invention, and may include structural analogues of N-methylpyrrolidone, for example N-ethylpyrrolidone and N-propylpyrrolidone, among other solvents. Of course, it will be recognized by those of ordinary skill in the art that a number of variations may be made to the structure of N-methylpyrrolidone without significantly affecting the physicochemical properties of the underlying stripping composition. Where required, one of ordinary skill in the art will know to vary the amounts and types of the other components within the stripping composition to produce an efficient paint stripping composition.

The present invention utilizes pyrrolidone compounds such as N-Methylpyrrolidone and similar compounds having a lactam moiety, but clearly N-methylpyrrolidone is preferred. As described hereinabove, the nitrogen of the pyrrolidone ring may be unsubstituted or substituted with alkyl groups. However, as the number of carbon atoms within the pyrrolidone compound increases beyond 3 (propyl), the water-miscibility decreases, thus affecting the ability of stripping compositions to accommodate water for microgel formation or for removal of the stripping composition from surfaces. In addition, such substitution may affect the solvent power of the pyrrolidone compound used, thus necessitating adjustments in the other components of the stripping composition. In addition to nitrogen substitution, the carbon atoms of the pyrrolidone ring may also be substituted, but such compositions for use in the present invention are less preferred than N-Methylpyrrolidone because of the cost of such compositions and the reduced polarity that often results from such substitution. For example, N,5-dimethyl 2-pyrrolidone, 2-pyrrolidone, 3,3-dimethyl 2-pyrrolidone may be used in the present invention, but are less preferred than is N-Methylpyrrolidone.

The 2-keto group of N-methylpyrrolidone is not a requirement for the pyrrolidone compound of the present invention and certain pyrrolidine analogs, for example, N,2-dimethylpyrrolidine, 2,4-dimethylpyrrolidine, 2,5-dimethylpyrrolidine and N-methylpyrrolidine, among others may also be used in the present invention. Pyrrolidone and pyrrolidine compounds which may be used in the present invention may be less polar than N-Methylpyrrolidone thus necessitating adjustment to the amount and type of surfactant and/or terpene compound used.

The terpenes and N-methylpyrrolidone are miscible, and N-methylpyrrolidone itself is miscible in water. However, the terpenes and water are not miscible. Therefore, in order to provide compositions which have sufficient quantities of terpene compounds to solubilize and expand coating polymers yet accommodate minor amounts of water for microgel formation and greater amounts of water for ease of removal, one or more terpene emulsifying surfactants are included in compositions of the present invention in an amount equal to about 2% to about 20% by weight and preferably about 8% to about 15 % by weight of the paint stripping compositions of the present invention. Numerous surfactants capable of emulsifying the terpenes of the present invention may be employed, including but not limited to linear or branched chain alcoholic ethoxylates and ethoxysulfates, alcohol ethoxylates, polysorbate esters, ethoxylated alkylphenols, for example, polyethoxynonylphenols, phenoxypolyalkoxyalcohols, for example, nonylphenoxypoly(ethyleneoxy)ethanol and nonylphenoxypolyethoxyethanol, alkyl and alkyl ether sulfates and sulfonates, for example, dodecylbenzenesulfonic acid, alkyl and dialkyl succinate compounds, phosphate esters, for example phosphate esters of long-chain alcohol ethoxylates and combinations of these surfactants. Particularly preferred surfactants for use in compositions of the present invention include the phosphate ester surfactants, for example PD-600 TM, an alkaline stable mixture of mono and di-substituted phosphate esters of decylalcoholethoxylate, available from Chemax, Inc. (Greenville, S.C.) and the Tryfac TM phosphate esters, a series of phosphate ester surfactants as the free acids or various salts, available from Emery Chemicals, Mauldin, S.C. Other preferred surfactants include polyoxyethylenenonylphenol (NP-6 TM and NP-9 TM, available from Chemax, Inc., Greenville, S.C.) as well as the nonionic alkylphenoxypolyoxyethylene alcohols, the Makon TM series, available from Stepan Company, Northfield, Ill. Alkylamine dodecylbenzenesulfonate, Ninate 411 TM, available from Stepan Company, the linear alkylbenzene sulfonic acid surfactant Bio-soft s-100 TM, available from Stepan, sodium 1-octane sulfonate, Bio-terge pas-8s TM, available from Stepan and Neodol 1-5 TM, a nonionic surfactant having an average of 5.0 ethylene oxide units per molecule of alcohol, available from Chemax, Inc., are also useful in the present invention. A preferred surfactant for use in paint strippers having an alkaline or basic pH includes CSX-727, an alkaline stable surfactant also available from Chemax, Inc. These preferred surfactants may be used alone or in combination to enhance the activity of the terpinoid and N-methylpyrrolidone mixture and to produce paint strippers having excellent paint stripping activity.

The pH of the paint stripper compositions of the present invention may vary from highly acidic to highly alkaline within the range of about 2.0 to greater than 11.0. Preferred compositions generally have a neutral pH. Paint strippers of the present invention which are to be used as industrial or military paint strippers may be very alkaline, i.e., have a pH above about 10.0, because enhanced paint stripping activity has been exhibited by paint strippers having a pH above about 10.0. However, a number of preferred embodiments of the paint stripper of the present invention have a pH within the range of about 5.5 to about 8.0 and preferably within the range of about 6.0 to about 8.0. It is a particularly surprising result that paint stripper compositions of the present invention show substantial paint stripping activity in the industrial setting within a neutral pH range of about 6.0 to about 7.0. Thus, although an acidic or basic accelerator may be added to compositions of the present invention to increase stripping efficiency and shorten stripping time, such an acidic or basic accelerator is not necessary. In compositions to be used in the home by the consuming public, it is preferred to exclude an acidic or basic accelerator which generally reduces the safety of the compositions.

Although anionic, nonionic and cationic surfactants may be employed in certain embodiments of the present invention, it is preferable to employ nonionic surfactants. It may be preferable in certain embodiments of the present invention to include a mixture of surfactants to enhance the solubility of certain active components in oil or water. A surfactant mixture may serve to promote the stripping of the polymeric coating by the active components and enhance the removal of the stripper and stripped coating by a washing step.

Compositions of the present invention may also include a solvent extender in an amount equal to about 5 to about 15 percent by weight of the compositions. The solvent extenders in the present invention function primarily as bulking agents, but they may also function to enhance certain solubility characteristics of the compositions. In addition, the solvent extenders used in the present invention may be useful for forming microgel from thixotropic agents used in the present invention. Typical solvent extenders for use in the present invention include small chain alcohols, for example, ethanol and isopropanol, among others.

Paint stripper compositions of the present invention may also include about 10% to about 60%, preferably about 20% to about 40% of a high flash point, high $K_B$ (kauri-butanol) solvent selected from the group consisting of polycarbonates, including ethylene carbonate, propylene carbonate and butylene carbonate, and glycols and glycol ethers. This high flash point, high $K_B$ solvent is added to increase the flash point of compositions as well as maintain the ability of the compositions to blister and remove polymeric coatings from surfaces. The paint stripping compositions of the present invention have a flash point of at least about 150° F., preferably at least about 175° F. and most preferably at least about 200° F., flash points which are obtainable, at least in part by virtue of the amount of high flash point solvent added to the compositions. Preferred high flash point solvents for use in the present invention have a flash point of at least about 80° C. and a $K_B$ of at least about 300.

Glycols useful in embodiments of the present invention include ethylene glycol, propylene glycol and butylene glycol, among others. Glycol ethers may be selected from among a number of agents including ethyleneglycolmonomethylether, di-ethyleneglycolmonomethylether, tri-ethyleneglycolmonomethylether, ethyleneglycolmonoethylether, di-ethyleneglycolmonoethylether, triethyleneglycolmonoethylether, ethyleneglycolmonopropylether, di-ethyleneglycolmonopropylether, ethyleneglycolmonobutylether, di-ethyleneglycolmonobuylthylether, tri-ethyleneglycolmonobutylether, ethyleneglycolmonohexylether, di-ethyleneglycolmonohexylether, ethoxypropyleneglycolmonobutylether, propyleneglycolmonomethylether, di-propyleneglycolmonomethylether, tri-propyleneglycolmonomethylether, propyleneglycolmonopropylether, di-propyleneglycolmonopropylether, propyleneglycolmono-t-butylether, propyleneglycolmonobutylether and dipropyleneglycolmonobutylether, among others. Preferably, propylene carbonate is used in compositions of the present invention because of its favorable flash point and $K_B$ value as well as its general safety and lack of toxicity.

Another component which may be added to the compositions of the present invention includes water in an amount equal to about 0% to about 20%, preferably 0.5% to about 20% by weight of the composition. Water is added in certain embodiments to provide solubility characterisitics so that the stripping compositions, after they have blistered the paint or varnish coating a surface to be stripped, may be washed off from the surface with a stream of water. In addition, in certain embodiments containing a thixotropic agent, water is added to aid the formation of microgel. While it is possible to add as much as 20% by weight of water to the compositions of the present invention, preferably water comprises no more than about 10% by weight and most preferably about 2% to about 5% by weight of the composition. Of course, as the percent by weight of water changes, the other components of the compositions and in particular, the terpene and terpene emulsifying surfactant components may have to be adjusted to accommodate the additional water.

Compositions of the present invention may also include a thixotropic agent to increase viscosity so that compositions of the present invention may be applied to vertical surfaces without running off. Compositions of the present invention may comprise between 0% and about 5% of a thixotropic agent, preferably about 0.02% to about 5% and most preferably, about 1% to about 3% by weight of a thixotropic agent. Certain thixotropic compositions, for example methylcellulose, such as Methocel 311 TM, available from Dow Chemical Corp., Midland, Mich., hydroxypropyl cellulose, Klucell TM, available from Hercules, Inc., Wilmington, Del., ethyl cellulose ethers, such as Bermocol PR TM, available from Seaboard Sales, N.J.) and clays modified with quaternary compounds (high, medium and low polar), such as Bentone 27, a product of NL Industries, N.J., U.S.A. are preferred, with ethylcellulose being especially preferred. Compositions of the present invention include a thixotropic agent to increase the viscosity of the compositions to a level which will result in a paint stripper which will remain on vertical surfaces for a period of time at least long enough to blister the polymeric coating on such surface and exhibit efficient stripping efficiency. Preferred thixotropic agents include ethyl cellulose, among other agents, which produce a microgel when mixed into the paint stripping compositions of the present invention.

Microgel formation may be produced by any method including simply mixing the thixotropic agent into the composition at any time. However, it is advantageous to form a microgel separately from the active components to prevent their encapsulation Microgel formation which occurs separately from the other active agents in the compositions of the present invention produces a composition exhibiting acceptable thixotropy for stripping or removing polymeric coatings on vertical surfaces and enhanced stripping activity. In addition, this method of the present invention comprising forming microgel separately from the active agents (in the presence of water and/or a bulking agent such as ethanol) and then adding the microgel mixture to the separately mixed active component results in a composition that is much easier to make and the quality control of which can be easily monitored.

In certain embodiments of the present invention, especially those compositions which may be used to remove especially difficult polymers, for example in many military and industrial applications, compositions of the present invention, may additionally comprise between 0% and 40% by weight of a chlorinated, fluorinated hydrocarbon (chlorofluorocarbons or CFCs) having a boiling point of at least about 45° C. The weight percent of CFCs used in compositions of this aspect of the present invention ranges between 0% and 40%, preferably about 5% to about 25% and most preferably about 8% to about 18% by weight of the paint stripping compositions. The CFCs are added to compositions of the present invention to provide an additional component to blister the polymeric coatings on surfaces. Paint stripping compositions of the present invention which include CFCs generally exhibit greater stripping efficiencies than those which do not.

A number of CFCs may be used in the present invention, but preferred CFCs have a boiling point that exceeds at least about 45° C. Although lower boiling point CFCs may be used, they are difficult to work with because of their tendency to volatilize rapidly. CFCs used in the present invention are non-flammable and do not flash and are advantageously included in certain compositions of the present invention to modify the stripping efficiency as well as increase the flash point of the composition. Preferred CFCs include those in which the number of fluorine atoms is the same or greater than the number of chlorine atoms and the number of carbon atoms ranges from 2 to 4. Exemplary CFCs include $CCl_2F_2$ (CFC 113 TM, available from DuPont, Wilmington Del.), $CHCl_2CF_3$ (CFC 123 TM, also available from DuPont), $CHClF_2CH_2Cl$ (1,2-dichloro-1,1-difluoroethane), $CHClFCH_2Cl$ (1,2-dichloro-1-fluoroethane), $CCl_2FCCl_2F$ (1,1,2,2-tetrachloro-1,2-difluoroethane), $CHClFCHCl_2$ (1,2,2-trichloro-1-fluoro-ethane), $FCl_2CCCl_3$ (fluoropentachloroethane), $F(CH_2)_3Cl$ (1-chloro-3-fluoropropane), $CH_2ClCF_2CH_3$ (1-chloro-2,2-difluoropropane), $CH_2ClCClFCH_3$ (1,2-dichloro-2-fluoropropane), $CF_2ClCClFCClF_2$ (1,2,3-trichloro-1,1,2,3,3-pentafluoropropane), $CF_2ClCCl_2CF_2Cl$ (1,2,2,3-tetrachloro-1,1,3,3-tetrafluoropropane) and $Cl(CH_2)_4F$ (1-chloro-4-fluoro-butane), among others. Most preferably, HCFC 123 TM is used in certain embodiments of the present invention in amounts ranging from about 5% to about 40%, preferably about 8% to about 25% and most preferably about 10% to about 18% by weight of the compositions.

The compositions of the present invention are generally applied to the surface to be stripped in the usual manner, i.e., the compositions are first applied by brush, spatula or other applicator and then are applied to the surface to be stripped. Alternatively, the compositions may be sprayed onto a surface in a continuous flow method which recirculates the composition. Generally, the compositions are in contact with the surface for a period of time sufficient to produce a blistering of the polymeric coating, after which time, the blistered coating is removed by contacting the coating with an abrasive pad. Alternatively, the coating is removed by simply lifting the blistered coating off of the surface or by spraying the blistered coating with water.

In a particularly preferred embodiment of the present invention, the stripping compositions of the present invention are adsorbed onto a fabric piece comprising cloth or paper and applied to a surface to be stripped. Generally, a non-woven, highly absorbent fabric, without chemical binders is used. Although any fabric or paper which absorbs the compositions of the present invention and is stable to the compositions of the present invention may be used in this aspect of the present invention, preferred fabrics include a thermally bonded composite blend of cellulose and propylene (cellulose/propylene), typically a 50—50 percent by weight blend of each component. Additionally, different fabrics based upon polyester, rayon/polyester blends and woodpulp/polyester blends (the Sontara TM fabrics from DuPont), among others may be used efficiently. The fabric may range in thickness and abrasive quality, but typically, preferred fabrics range in thickness from about 0.28 mm up to 1.02 mm.

Generally, cloth having a basis weight of approximately 2 ounces/yard is satisfactory for use in the present invention, but the basis weight may vary without impacting the stripping efficiency of the compositions of the present invention. Fabric to which compositions of the present invention are adsorbed are generally packaged in a barrier bag to prevent the transmission of vapor. Generally, the barrier bag is made of aluminum foil or other material which will not transmit vapor from the paint stripping compositions of the present invention.

The procedure for making the fabric applicator of the present invention is quite simple. In general, fabric is cut or slit to the appropriate size depending upon application, folded and inserted into the barrier bag which is sealed on three of four sides. Thereafter, a metered volume of stripper composition is injected into the open end of the barrier bag which is then immediately sealed. After the injection of paint stripper and during storage, the paint stripper composition impregnates the fabric applicator.

The fabric applicator is designed to blister and remove coatings from surfaces. It is especially useful when applied to vertical surfaces because it adheres when applied. The fabric applicator and paint stripper composition is designed so that there is sufficient tension between the applicator and the applied surface to retain it on the surface of the wall. By design, the applicator continuously applies composition to the surface to be stripped until the paint has lifted. A particularly advantageous feature of this aspect of the present invention is the fact that paint stripper composition will not evaporate from the applied surface because the fabric significantly reduces evaporation. Thus, the fabric embodiment of the present invention may be used on particularly difficult coatings and on multiple layers where the contact time between the paint stripper and the coated surface needs to be longer than in less rigorous applications.

To use the fabric aspect of the present invention, the fabric applicator to which stripper composition is adsorbed is placed on a coated surface. The applicator remains in contact with the coated surface for a period sufficient to blister the underlying coating. Such period may be 24 hours or longer for particularly difficult coatings. Once the coating blisters, the applicator is simply peeled off, usually with the underlying coating fixed to the applicator. Often there is no need to scrap or abrade the coating.

The following characterics are identifiable in compositions of the present invention:

(1) Increased stripping efficiency, i.e., reduced stripping time, and increased penetration through multiple layers comparable to commercially available methylene chloride strippers.
(2) Raised flash point of the formulations to provide a stripper which will not evaporate within a stripping period.
(3) Minimized objectionable odors.
(4) Neutral pH for widest possible range of utilization and safety.
(5) Highest possible TLV (threshold limit value) and exposure, lowest toxicity, and maximum environmental acceptability.
(6) A water soluble stripper composition which can be used in industrial settings where removal is performed by spraying a stripped surface with water.
(7) Impregnate absorbent material for application of impregnated sheets to vertical surfaces to be stripped.
(8) Fabric applicator utilizes absorbent materials with properties of low density, high absorbancy and durability, without binders, and non-effected by ingrediants of composition.

The following examples are provided to illustrate the present invention and should not be misunderstood to limit the scope of the present invention in any way.

EXAMPLES

General Procedure for Formulating Examples 1-22

Each component to comprise the paint stripping composition of the present invention is weighed out. Generally, the terpene and N-methylpyrrolidone or its equivalent are first blended. A high flash point, high $K_B$ solvent may then be added to the above mixture. The surfactant system is first mixed (surfactant and water) and then added to water and mixed. The water/surfactant mixture is then added to the terpene and N-methylepyrrolidone. In cases where a thixotropic agent was added, thixotropic agent is added to water and a bulking agent which are blended together using an air-driven agitator until homogeneous. The mixture containing thixotropic agent is then added to the terpene/N-methylpyrrolidone/surfacant mixture of components. This mixture is then agitated until the composition is homogeneous.

General Testing Procedures

Standardized test panels coated with the substrate to be stripped are prepared. Enamels, alkyds, epoxies, latex, acrylics and, conventional lacquers were tested. All testing was performed on metal plates with three coats of paint, each coat of different color so as to permit observation and time measurement of coating penetration. Stripping efficiency is defined as the ratio of the time required to observe blistering divided by 20 (minutes).

The testing of strippers occurred in three steps. In the first step, utilizing standard test plates, a droplet approximately ¼ inch in diameter of a stripping composition is placed onto the test plate, and the time until the coating blisters is then measured. Compositions which showed a stripping time of less than 40 minutes are then tested in a second test. In the second test, the coating composition is then applied onto a substrate by brushing and the time to blister is measured. In a third test, candidate compositions are tested for stripping efficiency, odor, ease of use and product satisfaction. In this third test, two methods of stripper application have been utilized.

The first method is continuous flow, where the composition is applied to the substrate by pumping (air pressure) and recirculation of the solution while an abrasive pad is used to remove the coating. This application requires a liquid solution in order to facilitate flow and pumping. In a second method of the third test, a thixotropic solution (to minimize flow and dripping when applied) is brushed onto irregular, ornate or vertical surfaces. In the third test, the formulations of the present invention were compared to conventional paint strippers. The most challenging substrates were chosen to be stripped, to establish the perfomance criteria expected of competitive paint strippers.

EXAMPLE 1

| Alkaline Stripper System #1 | |
| --- | --- |
| COMPONENT | WEIGHT PERCENT |
| DIPENTENE | 47 |
| ISOPROPANOL | 6 |
| N-METHYLPYRROLIDONE | 33 |
| SURFACTANT SYSTEM | |
| (WITCOLATE D5-10) | 8 |
| (NP-9) | 4 |
| WATER/KOH | 2 |

Procedure: Dipentene, isopropanol and N-methylpyrrolidone were mixed separately. Surfactant system and water were first mixed separately and then added to above mixture.
Result: Useful compositions for stripping. Stripping time was about 60 minutes. Phase separations and solution stratification were evidenced.

EXAMPLE 2

| Alkaline Stripper System #2 | |
| --- | --- |
| COMPONENT | WEIGHT PERCENT |
| DIPENTENE | 47 |
| ISOPROPANOL | 6 |
| M-PYRROLIDONE | 33 |
| SURFACTANT SYSTEM | |
| (WITCOLATE D5-10) | 8 |
| NP-6 [polyoxyethylene (6) nonyl phenol] | 4 |
| WATER/KOH | 2 |

Procedure: Same as example 1.
Results: pH in the alkaline range. Stripping time was about 60 minutes. Useful stripper composition which evidenced phase-separation upon standing. Must be vigorously mixed before use.

EXAMPLE 3

| Alkaline Stripper System #3 | |
| --- | --- |
| COMPONENT | WEIGHT PERCENT |
| DIPENTENE | 47 |
| ISOPROPANOL | 6 |
| N-METHYLPYRROLIDONE | 33 |
| SURFACTANT SYSTEM: CSX-727/KOH (75% solution) | 12 |
| KASIL | |
| WATER | 2 |

Procedure: Same as examples 1 and 2.
Results: pH alkaline. Composition effective, but turbid. Stripping time was about 60 minutes. All components could not be completely solubilized.

EXAMPLE 4

| Alkaline Stripper System #4 | |
| --- | --- |
| COMPONENT | WEIGHT PERCENT |
| DIPENTENE | 47 |
| ISOPROPANOL | 6 |
| N-METHYLPYRROLIDONE | 33 |
| SURFACTANT SYSTEM: CSX-727/KOH (50%) | 12 |
| KASIL #1 | |
| WATER | 2 |

Procedure: General method, as per examples 1-3
Results: Same as example 3- produced a useful but turbid suspension. Not all components solubilized.

EXAMPLE 5

| Alkaline Stripper System #5 | |
| --- | --- |
| COMPONENT | WEIGHT PERCENT |
| KOH SOLUTION (75%) | 33 |
| KABIL #1 | 32 |
| CSX 727 | 5 |
| METHYL PYRROLIDONE | 10 |
| FURFURYL ALCOHOL | 20 |

Procedure: Same as general method. KOH solution, CSX 727 and Kabil #1 mixed separately until completely homogeneous.
Results: pH is alkaline. Stripping efficiency marginal (50 min. to soften—no lifting evident).

EXAMPLE 6

| Alkaline Stripper System #6 | |
| --- | --- |
| COMPONENT | WEIGHT PERCENT |
| KOH SOLUTION (75%) | 20 |
| KASIL #1 | 32 |
| CSX 727 | 5 |
| DIPENTENE | 13 |
| N-METHYL PYRROLIDONE | 10 |
| FURFURYL ALCOHOL | 20 |

Procedure: General method, same as example 5.
Results: pH is alkaline, somewhat malodorous. Marginal stripping efficiency evidenced. Results similar to example 5. Malodor associated with dipentene at high pH. Alkaline based strippers (Examples 1-6) showed utility, but compositions needed to be buffered to produce a long shelf-life product.

EXAMPLE 7

| Neutral pH Stripper System #1 | |
| --- | --- |
| COMPONENT | WEIGHT PERCENT |
| PROPYLENE CARBONATE | 45 |
| N-METHYL PYRROLIDONE | 25 |
| PD-600 (phosphate ester) | 7 |
| GLIDCOL 95 (pine oil derivative with high $K_B$) | 3 |
| DIPENTENE | 7 |
| ISOPROPANOL | 9 |
| WATER | 3 |
| METHYL CELLULOSE | 1 |

Procedure: Follows general method. About half of water is used to create surfactant/water mixture which is added to mixture of propylene carbonate, n-methylpyrrolidone, glidcol 95 and dipentene. Other half of water is used with isopropanol and methyl cellulose to produce microgel mixture which is added to mixture of other components.

Results: Compositions showed better stripping efficiency than high pH systems. Stripping efficiency slightly reduced by methyl cellulose thickener.

EXAMPLE 8

Neutral pH Stripper System #2

| COMPONENTS | WEIGHT PERCENT |
| --- | --- |
| PROPYLENE CARBONATE | 45 |
| N-METHYL PYRROLIDONE | 25 |
| PD-600 | 7 |
| GLIDSOL 150 (pine oil derivative with high $K_B$) | 3 |
| DIPENTENE | 7 |
| ISOPROPANOL | 9 |
| WATER | 3 |
| METHYL CELLULOSE | 1 |

Procedure: Same as Example 7.
Results: Composition showed results similar to Example 7.

EXAMPLE 9

Neutral pH Stripper System #3

| COMPONENT | WEIGHT PERCENT |
| --- | --- |
| PROPYLENE CARBONATE | 45 |
| n-METHYL PYRROLIDONE | 25 |
| PD-600 | 7 |
| GLIDSOL 100 (pine oil derivative with high $K_B$) | 3 |
| DIPENTENE | 7 |
| ISOPROPANOL | 9 |
| Water | 3 |
| METHYL CELLULOSE | 1 |

Procedure: Same as example 7 and 8.
Results: Examples 7-9 utilize pine oil derivatives, which, although high in KB value, with higher flash points and less odor than dipentene tend to inhibit stripping efficiency to a certain degree compared to dipentene. Dipentene exhibits superior substrate penetration of paints and varnishes to other terpenoid solvents tested.

EXAMPLE 10

Neutral pH Stripper System #4

| COMPONENT | WEIGHT PERCENT |
| --- | --- |
| PHENOXY ETHANOL (DIETHYLENE GLYCOL MENOPHENYL ETHER) | 20 |
| DIPENTENE | 20 |
| D'LIMONENE | 10 |
| N-METHYL PYRROLIDONE | 15 |
| PD-600 | 8 |
| WATER | 2 |

Procedure: Same as examples 1-6 and general method.
Results: Good solvent properties—good stripping efficiency, about 30 minutes. Thoroughly miscible—no objectionable odors. Flash point slightly too low.

EXAMPLE 11

Neutral pH Stripper System #5

| COMPONENT | WEIGHT PERCENT |
| --- | --- |
| PHENOXY ETHANOL (DIETHYLENE GLYCOL MONOPHENYL ETHER) | 20 |
| DIPENTENE | 20 |
| D'LIMONENE | 10 |
| N-METHYL PYRROLIDONE | 40 |
| PD-600 | 8 |
| PROPYLENE CARBONATE/ ETHYLENE CARBONATE (50/50) | 25 |

EXAMPLE 11-continued

Neutral pH Stripper System #5

| COMPONENT | WEIGHT PERCENT |
| --- | --- |
| WATER | 2 |

Procedure: Same as example 10 and general method. Surfactant and water mixed separately and added to a mixture of the other components.
Results: Composition showed good stripping efficiency. But less favorable attributes of phenoxy ethanol from a safety standpoint associated with its use than for other surfacant systems. D'Limonene reduced the odor from dipentene.

EXAMPLE 12

Neutral pH Stripper System #6

| COMPONENT | WEIGHT PERCENT |
| --- | --- |
| PROPYLENE CARBONATE | 40 |
| N-METHYL PYRROLIDONE | 40 |
| D'LIMONENE | 5 |
| ISOPROPANOL | 5 |
| PD-600 | 8 |
| METHOCELL | 1 |
| WATER | 1 |

Procedure: Same as general method and examples 10 and 11, but methocell and water mixed separately to form microgel before adding to mixture of other components.
Results: Composition exhibited good stripping efficiency. Odor masked effectively by the d'limonene.

EXAMPLE 13

Neutral pH Stripper System #7

| COMPONENT | WEIGHT PERCENT |
| --- | --- |
| PROPYLENE CARBONATE | 30 |
| N-METHYL PYRROLIDONE | 30 |
| DIPENTENE | 20 |
| D'LIMONENE | 5 |
| ETHANOL | 5 |
| PD-600 | 8 |
| ETHYL CELLULOSE | 1 |
| WATER | 1 |

Procedure: Same as example 12 and general method.
Results: Good stripping efficiency. Ethyl cellulose exhibited better thixotropic characteristics than methyl cellulose.

EXAMPLE 14

Neutral pH Stripper System #8

| COMPONENT | WEIGHT PERCENT |
| --- | --- |
| PROPYLENE CARBONATE | 35 |
| N-METHYL PYRROLIDONE | 25 |
| DIPENTENE | 20 |
| D'LIMONENE | 5 |
| ETHANOL | 5 |
| PD-600 | 8 |
| ETHYL CELLULOSE | 1 |
| WATER | 1 |

Procedure: Same as examples 12 and 13 and the general method.
Results: Product exhibited good stripping efficiency, no odor.

EXAMPLE 15

Neutral pH Stripper System #9

| COMPONENT | WEIGHT PERCENT |
| --- | --- |
| PROPYLENE CARBONATE | 35 |

EXAMPLE 15-continued

| Neutral pH Stripper System #9 | |
|---|---|
| COMPONENT | WEIGHT PERCENT |
| N-METHYL PYRROLIDONE | 25 |
| DIPENTENE | 15 |
| D'LIMONENE | 5 |
| ETHANOL | 10 |
| PD-600 | 8 |
| ETHYL CELLULOSE | 1 |
| WATER | 1 |

Procedure: Same as examples 12, 13 and 14 and general method.
Results: Product evidenced good stripping efficiency, no odor.

EXAMPLE 16

| Neutral pH Stripper System #10 | |
|---|---|
| COMPONENT | WEIGHT PERCENT |
| PROPYLENE CARBONATE | 30 |
| N-METHYL PYRROLIDONE | 25 |
| DIPENTENE | 15 |
| D'LIMONENE | 3 |
| ETHANOL | 10 |
| PD-600 | 5 |
| ETHYL CELLULOSE | 1 |
| WATER | 1 |
| HCFC-123 | 10 |

Procedure: Same as 12, 13, 14 and 15. HCFC-123 added to propylene carbonate, N-methylpyrrolidone, dipentene, d'limonene and surfactant mixture until homogeneous. Thixotropic mixture added to above mixture until homogeneous.
Results: Excellent stripping efficiency (about 20-30 minutes). HCFC-123 provided additional stripping efficiency for composition. Odor was masked.

EXAMPLE 17

| Neutral pH Stripper System #11 | |
|---|---|
| COMPONENT | WEIGHT PERCENT |
| PROPYLENE CARBONATE | 30 |
| N-METHYL PYRROLIDONE | 25 |
| DIPENTENE | 15 |
| D'LIMONENE | 3 |
| ETHANOL | 10 |
| ETHYL CELLULOSE | 1 |
| PD-600 | 5 |
| WATER | 1 |
| HCFC 113 (FREON) | 10 |

Procedure: Same as Example 16, above.
Results: Excellent stripping efficiency on the order of about 20 to 30 minutes.

EXAMPLE 18

| Low pH Stripper Composition #1 | |
|---|---|
| DIPENTENE | 40 |
| ISOPROPANOL | 25 |
| N-METHYLPYRROLIDONE | 25 |
| DODECYLBENZENE SULFONIC ACID (LINEAR) | 8 |
| WATER | 2 |

Procedure: Same as general method and examples 1-6.
Results: pH is acidic. Stripping efficiency acceptable (about 60 minutes). Evidences that a composition having a pH below 7 may accelerate stripping action on substrates.

EXAMPLE 19

| Low pH Stripper Composition #2 | |
|---|---|
| Dipentene | 40 |
| N-Methylpyrrolidone | 25 |
| Triethanolamine | 4 |
| Dodecylbenzene Sulfonic Acid (linear) | 4 |
| Water | 2 |

Procedure: Same as Example 18.
Results: pH is acidic. Stripping efficiency marginal and certainly less acceptable than Example 18. Little stripping action observed for limited timeframe (about 60 minutes). Produced foam when washed off sample plate. Foam was apparently produced by in situ formation of triethanolamine sulfonate.

EXAMPLE 20

| Low pH Stripper Composition #3 | |
|---|---|
| Dipentene | 30 |
| Ethanol | 15 |
| N-Methylpyrrolidone | 20 |
| Ethylene Carbonate/Propylene Carbonate (50/50) | 20 |
| Dodecylbenzene Sulfonic Acid (linear) | 8 |
| Water | 7 |

Procedure: For the most part is the same as Examples 18 and 19. Heated ethylene carbonate sample, added an equal weight of propylene carbonate (solubility of ethylene carbonate is greater than that of propylene carbonate). Ethylene carbonate tended to crystallize out of solution upon cooling- re-solubilized upon heating.
Results: pH is acidic. Flash point lowered by increasing water content. Composition showed stripping activity, but was difficult to work with because of tendency of ethylene carbonate to crystallize out of solution.

EXAMPLE 21

| Low pH Stripper Composition #4 | |
|---|---|
| COMPONENT | WEIGHT PERCENT |
| Dipentene | 20 |
| Ethanol | 15 |
| N-Methylpyrrolidone | 25 |
| Propylene Carbonate | 30 |
| Dodecylbenzene Sulfonic Acid (linear) | 4 |
| Triethanolamine | 4 |
| Water | 2 |

Procedure: Same as general method and Examples 18 and 19.
Results: Acidic pH. Showed marginal stripping efficiency. Propylene carbonate increased the flash point. Evidence of foam from triethanolamine sulfonate.

EXAMPLE 22

| Low pH Stripper Composition #5 | |
|---|---|
| Component | Weight Percent |
| Dipentene | 20 |
| Ethanol | 15 |
| N-Methylpyrrolidone | 25 |
| Propylene Carbonate | 30 |
| Dodecylbenzene Sulfonic Acid (linear) | 8 |
| Water | 2 |

Procedure: Same as general method and Examples 21, 18 and 19.
Results: Showed marginal stripping efficiency, perhaps slightly better than example 21, because of absence of triethanolamine sulfonate foam. Propylene carbonate increased the flash point. Removal of triethanolamine resulted in no evidence of foam from triethanolamine sulfonate.

EXAMPLE 23

Impregnated Non-Woven Paint Strip Applicator Packaged in an Aluminum Foil Barrier Bag A non-woven, highly absorbent fabric, without chemical binders, thermally bonded composite blend of cellulose and polypropylene- typically a 50—50 (percent by weight) blend is used. Cloth having a basis weight of approximately 2 (oz./yd) has proven satisfactory. Other blends free of materials incompatible with stripper composition may be used. A fabric without additives, fillers or an adhesive promotes stability and shelf life of the product.

The stripper used may be any described hereinabove, but preferred stripper compositions include those as described in Examples 16 and 17.

Barrier bag (one which will not transmit vapor made of aluminum foil), for example, aluminum foil.

Procedure

The fabric bag is slit to an appropriate size, for example 3' by 4', folded and inserted into barrier package sealed on three sides. A metered volume of stripper composition, designed to impregnate the fabric is injected into the open end of the barrier bag which is then immediately sealed.

Results

The applicator is designed to blister and remove coatings from surfaces. It is particularly useful when applied to vertical surfaces because it adheres when applied. The applicator and paint stripper composition is designed so that there is sufficient surface tension between the applicator and the applied surface to retain it and allow it to continuously apply composition, without evaporation, until paint has lifted.

It is to be understood that the examples and embodiments described hereinabove are for the purposes of providing a description of the present invention by way of example and are not to be viewed as limiting the present invention in any way. Various modifications or changes that may be made to that described hereinabove by those of ordinary skill in the art are also contemplated by the present invention and are to be included within the spirit and purview of this application and the following claims.

I claim:

1. A composition for stripping a polymeric coating from a surface consisting essentially of:
   a. about 10% to about 60% by weight of a terpene compound;
   b. about 10% to about 50% by weight of a compound selected from the group consisting of pyrrolidones and pyrrolidines;
   c. about 2% to about 20% by weight of a terpene emulsifying surfactant; and
   d. about 10% to about 60% by weight of a high flash point, high KB solvent selected from the group consisting of ethylene carbonate and propylene carbonate.

2. The composition according to claim 1 wherein said solvent is propylene carbonate.

3. The composition according to claim 2 wherein said compound (b) is N-methylpyrrolidone.

4. The composition according to claim 3 further comprising about 5% to about 15% of a solvent extender or bulking agent.

5. The composition according to claim 4 wherein said surfactant is a phosphate ester surfactant.

6. The composition according to claim 4 wherein said surfactant is an alkaline stable mixture of mono and di-substituted phosphate esters of decylalcoholethoxylate.

7. The composition according to claim 5 wherein said surfactant is a phosphate ester of a long-chain alcohol ethoxylate.

8. The composition according to claim 6 wherein said terpene is dipentene.

9. The composition according to claim 8 further comprising an odor-masking compound.

10. The composition according to claim 9 wherein said odor-masking compound is d'limonene.

11. The composition according to claim 4 wherein said solvent extender or bulking agent is ethanol or isopropanol.

12. The composition according to claim 1 additionally comprising between about 0.5% and about 20% by weight water.

13. The composition according to claim 8 wherein said composition comprises about 1% to about 5% by weight water.

14. The composition according to claim 12 further comprising about 0.02% to about 5% by weight of a thixotropic agent.

15. The composition according to claim 14 wherein said thixotropic agent is selected from the group consisting of hydroxypropylcellulose, methyl cellulose and ethyl cellulose.

16. The composition according to claim 15 wherein said thixotropic agent is ethyl cellulose.

17. The composition according to claim 16 wherein said thixotropic agent is in the form of a microgel.

18. The composition according to claim 1 further comprising isopropanol, water, ethyl cellulose, N-methylpyrrolidone and d'limonene and wherein said terpene is dipentene and said surfactant is a phosphate ester surfactant.

19. The composition according to claim 18 having a pH ranging from about 6.0 to about 8.0.

20. An impregnated applicator for us in stripping a polymeric coating from a surface comprising:
   1. a paint stripping composition consisting essentially of:
      a. about 10% to about 60% by weight of a terpene compound;
      b. about 10% to about 50% by weight of a compound selected from the group consisting of pyrrolidones and pyrrolidines;
      c. about 2% to about 20% by weight of a terpene emulsifying surfactant; and
      d. about 10% to about 60% by weight of a high flashpoint, high $K_B$ solvent selected from ethylene carbonate and propylene carbonate; and
   2. a fabric piece comprising material stable to said stripping composition, wherein said composition is absorbed to said fabric pieces.

21. The applicator according to claim 20 wherein said fabric piece comprises non-woven, highly absorbent fabric containing an absence of chemical binders.

22. The applicator according to claim 20 wherein said fabric is selected from the group consisting of polyester, cellulose/propylene, rayon/polyester and woodpulp/polyester.

23. The applicator according to claim 20 wherein said solvent is propylene carbonate.

24. The applicator according to claim 20 wherein said solvent is propylene carbonate.

25. The applicator according to claim 24 further comprising about 5% to about 15% of a solvent extender or bulking agent.

26. The applicator according to claim 20 wherein said surfactant is a phosphate ester surfactant.

27. The applicator according to claim 25 wherein said surfactant is an alkaline stable mixture of mono and di-substituted phosphate esters of decylalcoholethoxylate.

28. The applicator according to claim 26 wherein said surfactant is a phosphate ester of a long-chain alcohol ethoxylate.

29. The applicator according to claim 25 wherein said terpene is dipentene.

30. The applicator according to claim 29 further comprising an odor-masking compound.

31. The applicator according to claim 30 wherein said odor-masking compound is d'limonene.

32. The applicator according to claim 25 wherein said solvent extender or bulking agent is ethanol or isopropanol.

33. The applicator according to claim 25 additionally comprising between about 0.5% and about 20% by weight water.

34. The applicator according to claim 33 wherein said composition comprises about 2% to about 5% by weight water.

35. The applicator according to claim 33 further comprising about 0.02% to about 5% by weight of a thxiotropic agent.

36. The applicator according to claim 35 wherein said thixotropic agent is selected from the group consisting of hydroxypropylcellulose, methyl cellulose and ethyl cellulose.

37. The applicator according to claim 36 wherein said thixotropic agent is ethyl cellulose.

38. The applicator according to claim 36 wherein said thixotropic agent is in the form of a microgel.

39. The applicator according to claim 20 having a pH ranging from about 6.0 to about 8.0.

40. The applicator according to claim 20 further comprising propylene carbonate, ethanol, water, ethyl cellulose, N-methylpyrrolidone and d'limonene and wherein said terpene is dipentene and said surfactant is a phosphate ester surfactant.

41. A method of making a paint stripper composition containing a microgel comprising:
 1. mixing a thixotropic agent in the presence of water and a solvent extender or bulking agent to produce a microgel-containing suspension; and
 2. adding said suspension to a mixture comprising:
  a. about 10% to about 60% by weight of a terpene compound;
  b. about 10% to about 50% by weight of a compound selected from the group consisting of pyrrolidones and pyrrolidines; and
  c. about 2% to about 20% by weight of a terpene emulsifying surfactant.

42. The method according to claim 41 wherein said mixture further comprises about 10% to about 60% by weight of a high flash point, high $K_B$ solvent selected from the group consisting of ethylene carbonate, propylene carbonate, glycols and glycol ethers.

43. The method according to claim 42 wherein said solvent is propylene carbonate.

44. The method according to claim 42 wherein said compound (b) is N-methylpyrrolidone.

45. The method according to claim 42 wherein said surfactant is a phosphate ester surfactant.

46. The method according to claim 45 wherein said surfactant is an alkaline stable mixture of mono- and di-substituted phosphate esters of decylalcoholethoxylate.

47. The method according to claim 45 wherein said surfactant is a phosphate ester of a long-chain alcohol ethoxylate.

48. The method according to claim 42 wherein said terpene is dipentene.

49. The method according to claim 48 wherein said mixture further comprises an odor-masking compound.

50. The method according to claim 49 wherein said odor-masking compound is d'limonene.

51. The method according to claim 42 wherein said solvent extender or bulking agent is ethanol or isopropanol.

52. The method according to claim 42 wherein the amount of water used comprises between about 0.5% and about 20% by weight of the final composition.

53. The method according to claim 52 wherein the amount of water comprises about 2% to about 5% by weight of the final composition.

54. The method according to claim 42 wherein said thixotropic agent comprises about 0.02% to about 5% by weight of the final composition.

55. The method according to claim 54 wherein said thixotropic agent is selected from the group consisting of hydroxypropylcellulose, methyl cellulose and ethyl cellulose.

56. The method according to claim 54 wherein said thixotropic agent is ethyl cellulose.

57. The method according to claim 41 wherein said final composition comprises propylene carbonate, ethanol, water, ethyl cellulose, N-methylpyrrolidone, d'limonene, dipentene and a phosphate ester surfactant.

58. The method according to claim 42 wherein said final composition has a pH ranging from about 6.0 to about 8.0.

59. A method for removing a polymeric coating from a surface comprising:
 1. applying to said coating an amount of a composition effective for removing said coating, said composition consisting essentially of:
  a. about 10% to about 60% by weight of a terpene compound;
  b. about 10% to about 50% by weight of a compound selected from the group consisting of pyrrolidones and pyrrolidines;
  c. about 2% to about 20% by weight of a terpene emulsifying surfactant; and
  d. about 10% to about 60% by weight of a high flash point, high KB solvent selected from ethylene carbonate and propylene carbonate;
 2. contacting said composition with said coating for a period ranging from about 20 minutes to about 90 minutes; and
 3. removing said composition and said polymeric coating from said surface.

60. The method according to claim 59 wherein said solvent is propylene carbonate.

61. The method according to claim 59 wherein said compound (b) is N-methylpyrrolidone.

62. The method according to claim 59 further comprising about 5% to about 15% of a solvent extender or bulking agent.

63. The method according to claim 62 wherein said surfactant is a phosphate ester surfactant.

64. The method according to claim 63 wherein said terpene is dipentene.

65. The method according to claim 62 wherein said solvent extender or bulking agent is ethanol or isopropanol.

66. The method according to claim 62 wherein said composition further comprises between about 0.5% and about 20% by weight water.

67. The method according to claim 66 further comprising about 0.02% to about 5% by weight of a thixotropic agent.

68. The method according to claim 67 wherein said thixotropic agent is ethyl cellulose in the form of a microgel.

69. The method according to claim 67 wherein said composition is removed (step 3) by spraying with water.

70. The method according to claim 59 wherein said composition comprises isopropanol, water, ethyl cellulose, N-methylpyrrolidone, d'limonene, dipentene and a phosphate ester surfactant.

71. The method according to claim 59 wherein said composition has a pH ranging from about 6.0 to about 8.0.

72. A method of removing a polymeric coating from a surface comprising:
1. applying to a polymeric coating an impregnated applicator comprising:
   a. a stripping composition consisting essentially of:
      i. about 10% to about 60% by weight of a terpene compound;
      ii. about 10% to about 50% by weight of a compound selected from the group consisting of pyrrolidones and pyrrolidones;
      iii. about 2% to about 20% by weight of a terpene emulsifying surfactant; and
      iv. about 10% to about 60% by weight of a high flash point, high KB solvent selected rom the group consisting of ethylene carbonate and propylene carbonate; and
   b. a fabric piece comprising a material stable to said stripping composition, herein said composition is absorbed to said fabric piece;
2. contacting said impregnated applicator to said polymeric coating for a time sufficient to remove said coating; and
3. removing said applicator from said surface.

73. The method according to claim 72 wherein said fabric piece comprises non-woven, highly absorbent fabric containing an absence of chemical binders.

74. The method according to claim 73 wherein said fabric is selected from the group consisting of polyester, cellulose/propylene, rayon/polyester and woodpulp/polyester.

75. The method according to claim 72 wherein said solvent is propylene carbonate.

76. The method according to claim 75 wherein said compound (ii) is N-methylpyrrolidone.

77. The method according to claim 72 wherein said stripping composition further comprises about 5% to about 15% of a solvent extender or bulking agent.

78. The method according to claim 77 wherein said surfactant is a phosphate ester surfactant.

79. The method according to claim 78 wherein said terpene is dipentene.

80. The method according to claim 77 wherein said solvent extender or bulking agent is ethanol or isopropanol.

81. The method according to claim 72 wherein said stripping composition further comprises between about 0.5% and about 20% by weight water.

82. The method according to claim 72 wherein said stripping composition further comprises about 0.02% to about 5% by weight of a thixotropic agent.

83. The method according to claim 72 wherein said thixotropic agent is selected from the group consisting of hydroxypropylcellulose, methyl cellulose and ethyl cellulose in the form of a microgel.

84. The method according to claim 72 having a pH ranging from about 6.0 to about 8.0.

85. The method according to claim 72 wherein said stripping composition comprises ethanol, water, ethyl cellulose, N-methylpyrrolidone, d'limonene, dipentene and a phosphate ester surfactant.

86. A composition for stripping a polymeric coating from a surface consisting essentially of:
a. about 10% to about 60% by weight of a terpene compound;
b. about 10% to about 50% by weight of a compound selected from the group consisting of pyrrolidones and pyrrolidines; and
c. about 2% to about 20% by weight of a terpene emulsifying surfactant.

* * * * *